United States Patent Office 3,809,742
Patented May 7, 1974

3,809,742
PROCESS FOR RECOVERING BARIUM FROM BARIUM SULFIDE LEACHING RESIDUES
Hartmut Simoleit, Hannover, and Helmut Schneider, Heilbronn, Germany, assignors to Kali-Chemie Aktiengesellschaft, Hannover, Germany
No Drawing. Filed July 9, 1971, Ser. No. 161,919
Claims priority, application Germany, July 9, 1970, P 20 34 065.2
Int. Cl. C01f 1/00; C01b 17/32, 17/42
U.S. Cl. 423—155                                    4 Claims

ABSTRACT OF THE DISCLOSURE

Process for recovering barium from barium sulfide leaching residues which comprises suspending the residues in water, introducing hydrogen sulfide or sulfur into the suspension whereby the barium is converted into readily soluble compounds thereof, separating from the resulting aqueous solution any insoluble residues present and recovering the desired barium compounds from the aqueous solution.

---

This invention relates to a process for recovering the barium compounds present in barium sulfide leaching residues. More particularly this invention relates to a process for treating the residues which are obtained in dissolving barium sulfide out of crude barium sulfur containing minerals.

Barium sulfide solutions are obtained by processes which involve the reduction of heavy spar with carbon in accordance with the known thermal processes and, dissolving out the barium sulfide with water from the crude product thus obtained. The leaching out is not complete so that the residue still contains up to 50% of barium in the form of its compounds. These barium compounds are present for the most part in the form of their silicates, ferrites, aluminates, thiosulfates, sulfites, and sulfates, the greater portion of which are soluble in acid.

A number of different procedures are already known for recovering the barium present in the leaching residues. Thus for example in German Pat. 1,069,597, a process is disclosed in which the leaching residue is first dissolved in hydrochloric acid which is preferably used in an amount that is less than an excess, the hydrochloric acid solution is then fractionally reacted with sodium hydroxide so that iron and aluminum in the form of their hydroxides are precipitated out and thereafter, after further addition of sodium hydroxide and cooling, the barium hydroxide octahydrate is precipitated out.

According to another process described in DDR Patent 65,915, the leaching residue is admixed with calcium chloride and a solid fuel such as crude brown coal or lignite and the mixture burned at a temperature of 700° C. The thereby formed barium chloride is then leached out of the residue with water.

Both of the above processes have not proved acceptable for the reason that they involve a considerable number of steps and further in that the process is not only involved and difficult but requires the expenditure of considerable energy.

According to still a further process which is disclosed in German Pat. 483,514, the residue is heated with an aqueous magnesium-, calcium- or iron salt solution and then through the use of chlorides the barium chloride crystallized out and filtered off following cooling. Using this process, the yield of barium chloride is relatively low and furthermore large amounts of water and high temperatures are required.

In accordance with the invention, it has now been found that the barium salts contained in barium sulfide leaching residues can be recovered in an economical and simple manner from barium sulfide residues by suspending the residue in water, converting the barium into its readily water soluble compounds by addition of hydrogen sulfide or sulfur to the suspension and, after separation of any insoluble residues from the resulting solution, processing the solution for the recovery of barium compounds.

Any calcium which is dissolved can be removed and separated by addition of barium sulfide solution prior to the filtration from the insoluble residue.

Simultaneously any hydrogen sulfide present in the solution is thereby chemically bound.

The process of the invention is easy to carry out, requires no expenditures for special apparatus and no high energy costs. The process has the further advantage that there can be directly precipitated from the barium containing solution, barium carbonate by addition of $CO_2$ thereto. Further by adding soda or by oxidation with air of the barium polysulfide solution formed in accordance with the invention, barium hydroxide can be formed and separated out. It is to be understood that the solution can also be processed to form other barium compounds from which barium can be recovered. In this manner the acid soluble barium present in the leaching residue can be recovered in a yield of up to 95%.

The reaction with hydrogen sulfide is advantageously carried out together with a procedure for forming barium carbonate by conversion of the barium sulfide solution with $CO_2$. The barium carbonate is precipitated out of solution and additionally hydrogen sulfide reformed. The reaction takes place according to the following reaction equation:

$$Ba(SH)_2 + CO_2 + H_2O \rightarrow BaCO_3 + 2H_2S$$

The thereby formed hydrogen sulfide is then available for sulfhydrogenation of the leaching residue so that the hydrogen sulfide is in effect recycled into the process. This has the advantage also that the process in accordance with the invention does not require additions of large amounts of chemicals. The leaching solutions from the residues after the sulfhydrogenation and separation of the barium, can be reused for leaching out additional crude barium sulfur so as to obtain an enrichment with BaS.

It is understood that in accordance with the invention the processing of the aqueous solutions obtained from the leaching residues can be carried out in many ways. For example the solutions can be treated by addition of acid to form the corresponding barium salts and again the hydrogen sulfide can then be recovered.

The sulfhydrogenation of the suspensions of the leaching residue is advantageously carried out at room temperature. It is to be understood however that higher or lower temperatures can be used and that it is most advantageous to work at a temperature of about room temperature as thereby no additional energy is required. The reaction with sulfur is preferably carried out at temperatures of from 80 to 110° C.

The process in accordance with the invention can be carried out either batchwise or continuously.

For increasing the yields recovered, it is desirable that the leaching residues are altered as little as possible, since, for example, oxidation of the leaching residue and absorption of carbon dioxide from the air reduce the yield of the process.

It is also possible to employ the thick sediment that settles out in the leaching step, that is, the leaching residue before filtration, after the main part of the barium sulfide solution has been decanted from the settling vessel and possibly after the leaching residue has been washed. The results are, however, as a rule less favorable on the ground that the recovered leaching residues still contain larger amounts of barium sulfide solution than if it had been filtered, so that the solution equilibrium for the recovered barium hydrogen sulfide formed in the sulfhydrogenation is undesirably changed. For increasing the yield, the suspension can be diluted with water. It depends on the conditions involved whether the saving of the filtration process institutes a more or less minor barium loss. For further increasing the yields, in particular when the leaching residue is aged, it is possible to carry out the sulfhydrogenation in a fractional manner, that is after the first sulfhydrogenation the remaining residue is filtered again suspended in water and then further treated with hydrogen sulfide. This process can be repeated a number of times. It is only a question of economics how many times the sulfhydrogenation should be repeated, in order to obtain the best yield of barium with the lowest recovered does not support the required expenditures of labor and energy.

When the leaching residues have been altered, sulfhydrogenation under pressure can be carried out whereby the yields are increased.

In the following examples which are given in order to more fully illustrate the invention without limiting the scope, in referring to "acid soluble or water soluble barium" the amounts were determined in the following manner:

50 g. of moist substance was heated to boiling with a 100 ml. concentrated hydrochloric acid for 15 minutes and after the addition of 200 ml. carbon dioxide-free water was again heated to boiling. After filtering and washing, the barium content was gravimetrically determined as barium sulfate.

The content of water soluble barium was determined as follows:

50 g. of moist substance was suspended in 300 ml. of water, the suspension heated for 15 minutes, filtered, washed and made up to 500 ml. The barium content of the solution was then titrimetrically determined with ½ N HCl and as a control the value for barium sulfate also gravimetrically determined.

EXAMPLE 1

500 g. of a freshly filtered leaching residue having a water content of 42.5% and a content of acid soluble barium, calculated on the dry material, of 34.8% corresponding to 100 g. barium were suspended in 3 liters of water. $H_2S$ was introduced into the aqueous suspension in excess. After 15 minutes the hydrogen sulfide introduction was discontinued and the insoluble residue present in the solution separated off. The residue was washed with water for a short time. The filtrate and the wash water contained a total of 94.3 g. barium. This corresponded to a yield of water soluble barium amounting to 94.3% calculated on the acid soluble barium.

EXAMPLE 2

In this example there is demonstrated that when the residue is aged the yield of barium can be still further increased through a repetition of the sulfhydrogenating reaction.

500 g. of an aged leaching residue was suspended in 3 liters of water. Hydrogen sulfide was then introduced into the resulting suspension at room temperature. After 15 minutes the hydrogen sulfide introduction was broken off, the insoluble residue separated out from the solution and the residue resuspended in 3 liters of fresh water. Hydrogen sulfide was then again passed into this suspension over a 15 minute period. The sulfhydrogenation was repeated for a total of 4 times. The results are set out in the following table.

TABLE 1

Fractional sulfhydrogenation of an aged leaching residue in five stages

|   | Percent |
|---|---|
| 1 stage | 76.0 |
| 2 stage | 12.4 |
| 3 stage | 3.8 |
| 4 stage | 1.8 |
| 5 stage | 1.4 |
|   | 95.4 |

The figures show that by means of a five stage sulfhydrogenation 95.4% of acid soluble barium could be dissolved out of the aged residue. Through further repetition of the sulfhydrogenation substantially all of the acid soluble barium could be dissolved out; it is recommended however that the sulfhydrogenation not be carried out further than the second stage since in the subsequent stages the ratio of barium which is recovered is not in an economically reasonable relationship to the amount of water and energy required for the separation steps. If fresh leaching residue is employed this multi-stage sulfhydrogenation is generally not required.

EXAMPLE 3

An aqueous suspension of 500 g. leaching residue (40.95% moisture, 18.85% acid solution barium calculated on the wet residue of 31.8% calculated on the dry material) was suspended in 3 liters of water and reacted with 50 g. of sulfur and then heated to 90° C. for 30 minutes.

The yield of water soluble barium calculated on the acid soluble barium amounted to 42.7%.

With this method, the yield of water soluble barium compounds is lower than when the sulfhydrogenation is used. Accordingly it should be used only if it is especially desired to recover barium polysulfides for example to be used in plant protection agents or where hydrogen sulfide is not available.

What is claimed is:

1. A process of recovering barium compounds from the crude barium sulfide-containing product that is obtained by heating heavy spar with carbon at an elevated temperature which comprises first leaching the barium sulfide from the product with water, thereafter adding to and suspending the undissolved residue which consists principally of water-insoluble barium silicates, ferrites, aluminates, thiosulfates, sulfites and sulfates, in a volume of fresh water, passing hydrogen sulfide into the resulting suspension at room temperature in such amounts and for such a period that a substantial proportion of the residue is dissolved in the water as barium hydrosulfide, and subsequently separating any remaining undissolved residue and recovering the dissolved barium compounds from the resulting solution.

2. A process as defined in claim 1 in which any remaining undissolved water-insoluble residue that still contains barium compounds is again added to and resuspended in a volume of fresh water and again subjected to treatment with hydrogen sulfide as specified in claim 1.

3. A process as defined in claim 1 in which a solution containing dissolved barium sulfide or barium hydrosulfide is treated with carbon dioxide to convert the dissolved barium compounds to barium carbonate and regenerate hydrogen sulfide for reuse in the process.

4. A process as defined in claim 1 in which a solution of barium sulfide is added to the suspension directly after the suspension has been treated with hydrogen sulfide as specified in claim 1, in order to precipitate as solids any calcium salts that had been dissolved in the suspension water during the treatment and thereby prevent the contamination of the solution of barium compounds with calcium compounds.

References Cited

UNITED STATES PATENTS

| 3,574,530 | 4/1971 | Suriani et al. | 23—66 X |
| 1,634,338 | 7/1927 | Pierce | 23—66 |

FOREIGN PATENTS

| 1,248 | 1897 | England. |
| 154,498 | 1902 | Germany. |

OSCAR R. VERTIZ, Primary Examiner

G. HELLER, Assistant Examiner

U.S. Cl. X.R.

423—165, 560, 431